United States Patent [19]

Rysti et al.

[11] 3,862,496
[45] Jan. 28, 1975

[54] METHOD FOR MEASURING THICKNESS OF PIECES OF TIMBER

[75] Inventors: Alpo Rysti, Frisans; Lasse Harma, Lahti; Kurt Sjodahl, Helsinki, all of Finland

[73] Assignee: Sateko Oy, Helsinki, Finland

[22] Filed: Aug. 9, 1973

[21] Appl. No.: 386,932

[30] Foreign Application Priority Data
Aug. 22, 1972 Finland.............................. 2325/72

[52] U.S. Cl..................... 33/124, 209/82, 33/169 R
[51] Int. Cl......................... G01b 5/02, B07b 13/02
[58] Field of Search...... 33/169 R, 172 E, 123, 124, 33/147 N, 147 B, 147 L, 148 B; 209/82

[56] References Cited
UNITED STATES PATENTS
1,778,202  10/1930  Schettler.............................. 33/124
2,360,594  10/1944  Stout et al. .......................... 33/123

Primary Examiner—Samuel B. Rothberg
Assistant Examiner—Willis Little
Attorney, Agent, or Firm—Richards & Geier

[57] ABSTRACT

The thickness of pieces of timber is measured while moving them in a plane transverse to their length at equal distances from each other. The measuring takes place by a plurality of measuring heads located above the timber pieces and movable along a closed path with a speed synchronous with the speed of the timber pieces. A measuring head rests against the upper surface of a piece of timber, while the following measuring head rests against the upper surface of the following piece of timber. These measuring heads are pushed by the pieces of timber into positions defined by the thicknesses of the timber pieces. Then, positions of the measuring heads are converted into signals containing information about the thicknesses of the respective timber pieces.

1 Claim, 7 Drawing Figures

PATENTED JAN 28 1975

METHOD FOR MEASURING THICKNESS OF PIECES OF TIMBER

The present invention concerns a method for measuring the thickness of pieces of timber wherein the pieces of timber are transported in transverse position by means of a table conveyor or equivalent and wherein the measurement of thickness is carried out by means of sensing means coming into contact with the upper surface of the pieces of timber and the position of which when in sensing contact is transformed into a signal containing the thickness information.

Along with the mechanizing of the handling of sawn timber, automatic equipment for measuring the length, thickness and breadth of the timber has been introduced, which directs the timber to predetermined sorting addresses in accordance with its distribution.

The measuring of sawn timber is most commonly carried out on a table conveyor, where the sawn timber proceeds in a transverse direction, carried along by dogs. The sensing of length and breadth is fairly easily accomplished e.g., by the aid of photocells, but difficulties have been encountered in sensing the thickness, because the thickness variations are rather wide (from 12 to 100 mm) and the timber proceeds at a high speed.

The sensing means known in prior art and used up to now have been elements resembling a ski and suspended by one or both ends to hang above the table conveyor, these means being displaced upwardly during the passage of a piece of timber underneath and descending once more for the next piece. The thickness has been recorded in various ways when the ski runner of the sensing means was in its top position.

It is a trend, generally in modern sorting installations, to make the mutual distances of the timber pieces as small as possible in order to avoid an excessive chain speed. As a consequence, the sensing elements have not time to operate properly in the small gap between pieces and at high speed (more than 100 pieces to be measured per minute), and they begin to bounce, thereby rendering the result of measurement unreliable and inaccurate.

The aim of the present invention is to eliminate the drawbacks pointed out in the foregoing. Accordingly, the method of the invention is mainly characterized in that in the method two or several sensing means are used which are moved above the table conveyor at a speed synchronous with that of the conveyor, and that a given sensing means assumes a position upon a given piece of timber and the next sensing element assumes on the table conveyor a position upon the next piece of timber, the position of the sensing means at a given point or in a given region being transformed with the aid of devices previously known in themselves into a signal containing the thickness information.

The device according to the invention, again, is mainly characterized in that above the table conveyor a rotating frame or a moving track has been mounted, to which sensing elements, most appropriately having a shape resembling that of ski runners, have been attached with a spacing determined by the spacing of the pieces of timber and which elements are free, at the sensing operation, to position themselves at a height determined by the thickness of the pieces of timber.

The invention is described in detail with reference to certain embodiment examples, presented in the figures of the attached drawing.

FIG. 1 presents, schematically, a thickness measuring device with a rotating disk, seen from the side with reference to the direction of travel of the table conveyor.

Figure 1:
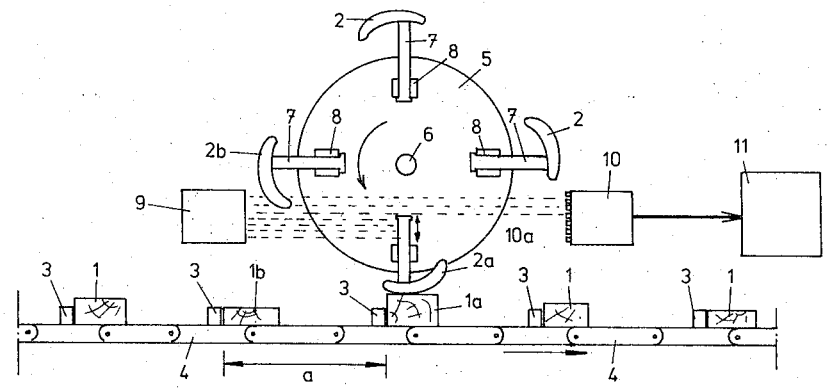

As can be seen from the figures, the table conveyor consists of chain tracks 4 disposed in parallel and carrying with a uniform spacing, a, dogs 3, by the aid of which timber pieces 1 of variable dimensions are transported further e.g., to undergo a sorting operation. According to FIG. 1 the device for measuring the thickness of pieces of timber 1 comprises a circular disk 5 rotatably mounted on a shaft 6. The disk 5 is driven, e.g., by means of a chain, at a speed which is synchronous with the speed of the chain tracks 4. To the disk 5 four sensing means 2 (the number of which may be two or more, as required) have been attached radially and with uniform spacing, and these sensing means have been provided with a ski runner-like sensing head. The sensing means 2 are connected to the disk 5 by an arm 7 and guides 8, so that the sensing means 2 may move within certain limits to assume different radial positions.

Figure 2:
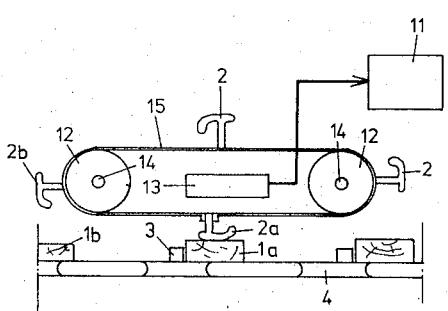
FIG. 2 shows in a manner similar to that of FIG. 1, a measuring device carried out with the aid of a moving track.
Figure 3:
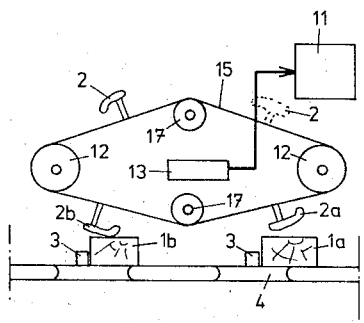
FIG. 3 shows an equivalent device having a substantially elliptical track.

The synchronization has been so adjusted that the sensing means 2 and timber pieces 1 will be in register (as is the case with the sensing means 2a and timber pieces 1a in FIGS. 1, 2 and 3), whereby the sensing means 2 moves upward into a position determined by the thickness of the timber piece 1. There are different ways in which this position can be transformed into a signal containing the thickness information. In FIG. 1 this transformation has been shown to take place by the aid of a light source 9 and a row of photocells 10, the arm 7 rising to intercept the light, whereby the uppermost photocell 10a receiving light will furnish the signal containing the thickness information. Another alternative is to provide the arm 7 with an aperture through which the light may pass to strike the photocell consistent with the position of the arm 7.

According to a feature substantially characteristic of the invention the mutual spacing of the sensing means 2 and their speed of movement are such that when a given sensing means 2 has been positioned to rest upon a given piece of timber 1, the next sensing element 2 will be positioned to rest upon the next piece of timber on the table conveyor. This ensures that one and the same sensing means will not measure two consecutive timber pieces 1, as has occurred in methods and devices of prior art.

In the example shown in FIG. 2 the disk 5 has been replaced with a track 15 moving at a speed synchronous with that of the table conveyor, such as a chain conveyor, and which operates supported by return wheels 12 rotatably mounted on shafts 14. The equipment for transforming the thickness information has been schematically represented as a block 13, and the recording and sorting equipment, to which the thickness information among others is conveyed, has been schematically represented as a block 11.

The device shown in FIG. 3 is otherwise as that of FIG. 2, except that owing to the addition of return rolls 17 the track 15 has a substantially elliptic shape. By this shape the advantage is gained that the sensing means 2 and the piece of timber 1 can be made to approach each other as slowly as possible, thus avoiding impacts on their meeting, which would reduce the accuracy of measurement. The measuring and recording of thickness takes place in FIG. 3 at the moment when the piece of timber 1 and the sensing means 2 are opposite to the lowest return roll 17.

Figure 4:
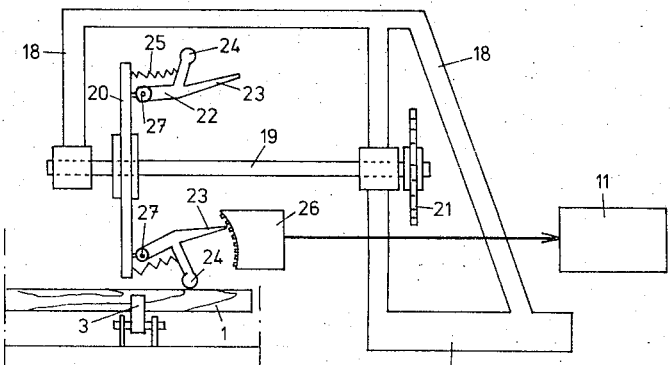
FIG. 4 shows, viewed in the direction of travel of the table conveyor, another measuring device carried out by the aid of a rotating disk.

In the embodiment example of FIG. 4 a shaft 19 has been journalled in the stationary frame 18 and it is driven at a speed synchronous with the table conveyor by means of a sprocket wheel 21. On the shaft 19 a circular disk 20 has been mounted, to which arms 22 have been attached by means of pivots 27 to be transversal to the plane of the disk 20, and which arms are forced into their outermost position by effect of a spring 25 and of centrifugal force. The arms 22 carry a sensing head 24, for instance of ski runner shape, which comes into contact with the piece of timber in a manner in accordance with the invention. The extension 23 of the arms 22 acts on a field 26 made up, for instance, of limit switches or microswitches and which furnishes the signal containing the thickness information.

Figure 5:
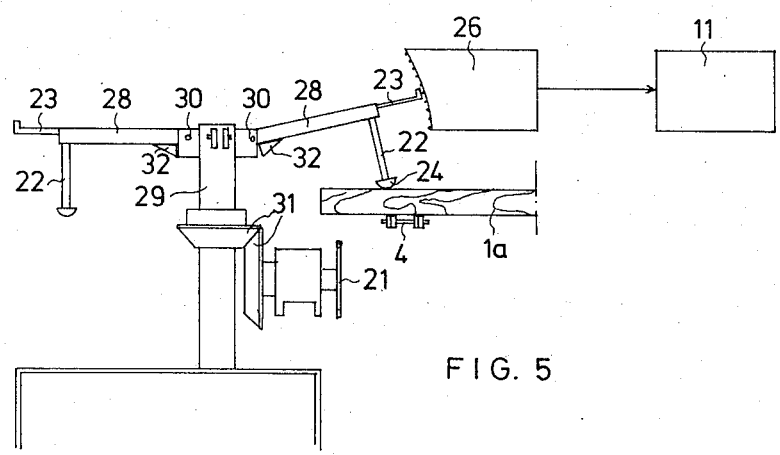
FIG. 5 shows, seen from one side, a device otherwise like that of FIG. 4, except that the rotating disk has been replaced with pivotally mounted arms attached to a vertical shaft.
Figure 7:
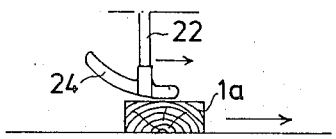
FIG. 7 shows, in elevational view, a sensing means upon the piece of timber to be measured.
Figure 6:
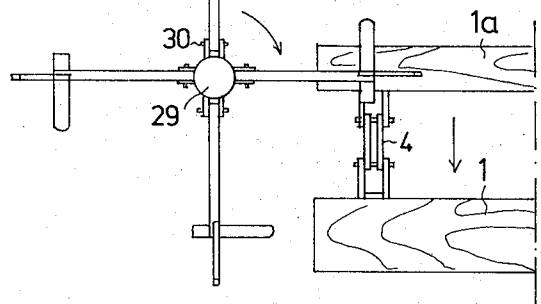
FIG. 6 shows the device of FIG. 5, viewed from above.

The embodiment presented in FIGS. 5, 6 and 7 is otherwise as that of FIG. 4, except that the circular disk 20 has been replaced with arms 28 pivotally attached by means of pins 30 to a vertical shaft 29 and which are substantially horizontal in their neutral position. The vertical shaft is rotated by a sprocket wheel 21 over bevel gears 31. No springs are absolutely necessary in connection with the arms 28, because the arms return to their neutral position by gravity effect. The shape of the sensing elements, which are most properly ski runner-like, is illustrated by FIG. 7. The reference numeral 32 indicated a stop attached to the arms 28, which restricts the downward turning of the arms 28.

It is unessential in the invention in what manner the position of the sensing means 2 is transformed into a signal containing the thickness information. In this connection devices other than those presented merely as examples in the foregoing may also be employed, such as mechanical, electrical or even pneumatic devices previously known in themselves.

We claim:

1. Method for measuring the thickness of pieces of timber by the use of measuring heads, comprising the steps of moving pieces of timber to be measured in a plane with their longitudinal direction traverse to the direction in which they are moved, said pieces of timber following each other at equal distances in said direction of movement, moving a plurality of measuring heads disposed above said plane along a closed path at a speed synchronous with the speed of the pieces of timber, whereby one measuring head assumes a position wherein it rests against the upper surface of one piece of timber and the measuring head which is next on said closed path assumes a position resting against the upper surface of the next piece of timber, displacing the measuring heads in contact with the pieces of timber in a direction transverse to their movement along said closed path, pushed by the pieces of timber into a position defined by the thickness of the respective pieces of timber, and converting said position of the measuring head into a signal containing the thickness information referring to the piece of timber in question.

* * * * *